United States Patent
Hayashi

(10) Patent No.: US 9,259,989 B2
(45) Date of Patent: Feb. 16, 2016

(54) HVAC UNIT-TXV POSITIONING

(71) Applicant: DENSO International America, Inc., Southfield, MI (US)

(72) Inventor: Hiroyuki Hayashi, West Bloomfield, MI (US)

(73) Assignee: Denso International America, Inc., Southfield, MI (US)

( * ) Notice: Subject to any disclaimer, the term of this patent is extended or adjusted under 35 U.S.C. 154(b) by 508 days.

(21) Appl. No.: 13/647,683

(22) Filed: Oct. 9, 2012

(65) Prior Publication Data

US 2014/0096559 A1    Apr. 10, 2014

(51) Int. Cl.
*B60H 1/02* (2006.01)
*B60H 1/00* (2006.01)
*B60H 1/32* (2006.01)

(52) U.S. Cl.
CPC .. *B60H 1/00* (2013.01); *B60H 1/32* (2013.01); *B60H 1/3229* (2013.01)

(58) Field of Classification Search
CPC .......... F60H 1/00; B60H 1/32; B60H 1/3229
USPC .......................................... 62/56, 238.7, 426
See application file for complete search history.

(56) References Cited

U.S. PATENT DOCUMENTS

| 4,829,777 A * | 5/1989 | Matsuoka et al. ............... 62/212 |
| 4,949,779 A * | 8/1990 | Kenny ............... B60H 1/00885 165/140 |
| 6,244,060 B1 | 6/2001 | Takano et al. |
| 6,403,540 B1 * | 6/2002 | Richardson ................... 508/440 |
| 2004/0050084 A1 | 3/2004 | Fukumi et al. |
| 2008/0264080 A1 * | 10/2008 | Creed et al. ...................... 62/132 |

FOREIGN PATENT DOCUMENTS

| DE | 10035666 | 2/2001 | |
| FR | 2796595 | 2/2001 | |
| JP | 09-193648 | 7/1997 | |
| JP | 2000-28233 | 1/2000 | |
| JP | 2000028233 A * | 1/2000 | .............. F25B 41/06 |
| JP | 2004-243936 | 9/2004 | |
| JP | 2005-112297 | 4/2005 | |
| JP | 2007-055429 | 8/2007 | |
| KR | 20020080137 | * 10/2002 | ............... G01G 7/00 |

OTHER PUBLICATIONS

Office Action issued May 8, 2014 in corresponding DE Application No. 1020131108504 (with English translation).
Office Action dated Nov. 25, 2014 in corresponding JP Application No. 2013-173675 with English translation.
Office Action mailed Jul. 2, 2015 in the corresponding CN Application No. 201310438904.8 with English translation.

* cited by examiner

*Primary Examiner* — Emmanuel Duke
(74) *Attorney, Agent, or Firm* — Harness, Dickey & Pierce, P.L.C.

(57) ABSTRACT

An air conditioning system including a blower, an evaporator, an airflow chamber, and a thermal expansion valve assembly. The airflow chamber extends between the blower and the evaporator to direct airflow generated by the blower to the evaporator. The thermal expansion valve assembly includes a valve and a sensor bulb. The valve is on an input side of the evaporator. The sensor bulb is arranged on an output side of the evaporator external to the airflow chamber, and in an airflow path of ambient air.

10 Claims, 1 Drawing Sheet

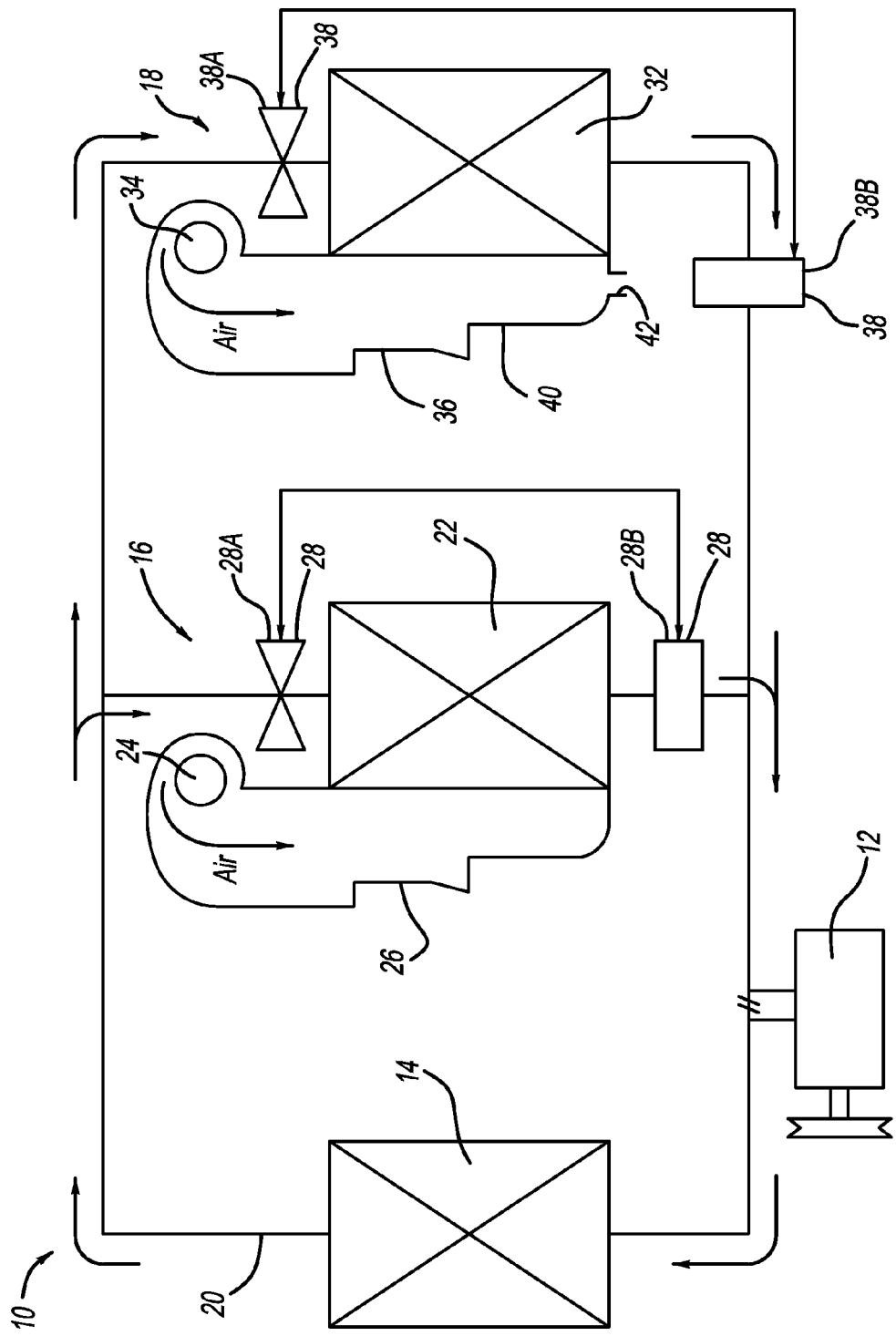

HVAC UNIT-TXV POSITIONING

FIELD

The present disclosure relates to an air conditioning system thermal expansion valve assembly.

BACKGROUND

This section provides background information related to the present disclosure, which is not necessarily prior art.

Air conditioning systems of extended length vehicles often include an auxiliary evaporator assembly at a rear thereof. Flow of refrigerant through an evaporator of the auxiliary, or rear, evaporator assembly is often controlled by a thermal expansion valve (TEV) assembly, which includes a valve at an input side of the evaporator and a sensor bulb at an output side of the evaporator. The valve meters flow of the refrigerant to the evaporator based on the temperature of the refrigerant that has passed through the evaporator, as sensed by the sensor bulb. For example, if the refrigerant sensed by the sensor bulb is above a predetermined temperature, then the valve will remain open to permit additional refrigerant to pass through the rear evaporator, thereby further cooling the evaporator. If the refrigerant is below a predetermined temperature, then the valve will close to prevent the evaporator from becoming over cooled.

Proximate to the evaporator is a rear blower. The blower generates airflow that is directed across the evaporator and into the rear of the passenger cabin. The airflow is cooled as it passes across the evaporator. In some instances, when the rear blower is turned on and cool air is desired, the rear evaporator assembly will initially blow warm air because the valve is closed, thereby restricting flow of refrigerant to the evaporator. The warm airflow continues until the valve is opened, which can take an undesirably long period of time. Initially blowing warm air into the passenger cabin when cool air is desired makes passengers uncomfortable.

The inventor determined that failure of the valve to timely open can be caused by failure of the valve to completely close when only the vehicle's front evaporator assembly is in use; and the rear evaporator assembly is not in use such that the rear blower is not activated. For example, if the valve remains open, refrigerant will flow through the evaporator and to the sensor bulb, thereby cooling the sensor bulb. If the sensor bulb is cooled below the predetermined temperature, the sensor bulb will signal the valve to close. Because the sensor bulb has been cooled below the predetermined temperature, the valve will not open until the sensor bulb warms to a temperature greater than the predetermined temperature. And because the sensor bulb is not exposed to ambient temperature, but is rather concealed in a case of the rear evaporator assembly, or a wall or floor of the vehicle, it often takes an undesirably long period of time for the sensor bulb to warm and the valve to open. In the meantime, rear passengers have to endure warm airflow until the valve opens.

SUMMARY

This section provides a general summary of the disclosure, and is not a comprehensive disclosure of its full scope or all of its features.

The present teachings provide for an air conditioning system including a blower, an evaporator, an airflow chamber, and a thermal expansion valve assembly. The airflow chamber extends between the blower and the evaporator to direct airflow generated by the blower to the evaporator. The thermal expansion valve assembly includes a valve and a sensor bulb. The valve is on an input side of the evaporator. The sensor bulb is arranged on an output side of the evaporator external to the airflow chamber, and in an airflow path of ambient air.

The present teachings also provide for an air conditioning system including a blower, an evaporator, an airflow chamber, and a thermal expansion valve (TEV) assembly. The airflow chamber extends between the blower and the evaporator to direct airflow generated by the blower to the evaporator. A wall of the airflow chamber defines an aperture. The TEV assembly is configured to regulate flow of refrigerant to the evaporator. The TEV assembly includes a sensor bulb outside of the chamber proximate to the aperture such that airflow generated by the blower reaches the sensor bulb.

The present teachings further provide for an air conditioning system including a condenser, a compressor, a front evaporator assembly, and a rear evaporator assembly. The rear evaporator assembly includes a sensor bulb exposed to ambient airflow to warm the sensor bulb when the sensor bulb is overcooled.

Further areas of applicability will become apparent from the description provided herein. The description and specific examples in this summary are intended for purposes of illustration only and are not intended to limit the scope of the present disclosure.

DRAWING

The drawing described herein is for illustrative purposes only of selected embodiments and not all possible implementations, and is not intended to limit the scope of the present disclosure.

FIG. 1 is a schematic drawing of an air conditioning system according to the present teachings.

DETAILED DESCRIPTION

Example embodiments will now be described more fully with reference to the accompanying drawings.

An air conditioning system according to the present teachings is illustrated in FIG. 1 at reference numeral 10. The system 10 generally includes a compressor 12, a condenser 14, a front evaporator assembly 16, and a rear evaporator assembly 18, each of which is connected by a refrigerant conduit 20. The air conditioning system 10 can be used in a variety of different applications and environments. For example, the air conditioning system 10 can be installed in a motor vehicle, such as an extended length motor vehicle.

When installed in a motor vehicle, the compressor 12 and the condenser 14 are typically installed at the front of the vehicle. The compressor 12 is a pump that can be driven by the vehicle's engine or a separate motor. The compressor 12 pumps refrigerant to the condenser 14, the front evaporator assembly 16, and the rear evaporator assembly 18.

The front evaporator assembly 16 is located at the front of the vehicle, typically behind the dashboard. The front evaporator assembly 16 includes a front evaporator 22, a front blower 24, a front airflow chamber 26, and a front thermal expansion valve (TEV) assembly 28 including a valve 28A and a sensor bulb 28B. The front airflow chamber 26 extends between the front blower 24 and the front evaporator 22 to direct airflow generated by the front blower 24 to the front evaporator 22 and across the front evaporator 22. The front blower 24 can be any suitable airflow generating device, such as a rotary fan.

The front TEV assembly 28 is located along the refrigerant conduit 20 proximate to the front evaporator 22 in order to regulate flow of refrigerant to the front evaporator 22. As illustrated, the valve 28A is arranged on an input side of the front evaporator 22 and the sensor bulb 28B is arranged on an output side of the front evaporator 22. The sensor bulb 28B is in fluid communication with the valve 28A. The valve 28A includes a spring to maintain the valve 28A in a closed position in order to restrict refrigerant from flowing through the valve 28A and into the front evaporator 22.

Both the valve 28A and the sensor bulb 28B include a metering gas, which can be similar to the refrigerant of the air conditioning system 10. As the temperature of the refrigerant exiting the front evaporator 22 increases, the metering gas of the sensor bulb 28B expands. Because the sensor bulb 28B is in fluid cooperation with the valve 28A, the metering gas of the valve 28A also expands, which applies pressure to the spring to cause the valve 28A to move from the closed position to an open position, thereby permitting refrigerant to pass through the valve 28A and into the front evaporator 22. As the temperature of the refrigerant exiting the front evaporator 22 decreases, the metering gas contracts to no longer apply pressure to the spring, thereby allowing the spring and the valve 28A to return to the closed position to restrict passage of refrigerant into the front evaporator 22.

The rear evaporator assembly 18 is located at a rear of the vehicle, and is typically installed in extended length vehicles, such as vans, SUVs, busses, limousines, etc. The rear evaporator assembly 18 includes a rear evaporator 32, a rear blower 34, a rear airflow chamber 36, and a rear thermal expansion valve (TEV) assembly 38 including a valve 38A and a sensor bulb 38B. The rear airflow chamber 36 extends between the rear blower 34 and the rear evaporator 32 to direct airflow generated by the rear blower 34 to the rear evaporator 32 and across the rear evaporator 32. The rear blower 34 can be any suitable airflow generating device, such as a rotary fan.

The valve 38A is arranged along the conduit 20 on an input side of the rear evaporator 32. The sensor bulb 38B is arranged along the conduit 20 on an output side of the rear evaporator 32. The valve 38A and the sensor bulb 38B of the rear TEV assembly 38 are substantially similar to the valve 28A and the sensor bulb 28B of the front TEV assembly 28.

The rear airflow chamber 36 includes a wall 40, which defines an aperture 42. The sensor bulb 38B is located along the conduit 20 outside of the rear airflow chamber 36, and proximate to the aperture 42. The sensor bulb 38B is positioned within a path of airflow generated by the rear blower 34. The sensor bulb 38B can be directly aligned with the aperture 42.

Because the sensor bulb 38B is outside of the rear airflow chamber 36, it is exposed to ambient air of the rear passenger cabin, which in combination with being positioned within the path of airflow generated by the rear blower 34 allows the sensor bulb 38B to be quickly warmed if overcooled. As described above in the Background Section, in situations where the valve 38A undesirably remains open when the rear evaporator assembly 18 is not in use (e.g. the blower 34 is inactive) the sensor bulb 38B can become overcooled, which may make the sensor bulb 38B less responsive to warm refrigerant flowing out of the rear evaporator 32, and may delay opening of the valve 38A. By arranging the sensor bulb 38B outside of the rear airflow chamber 36, an overcooled sensor bulb 38B can be quickly warmed by ambient air, thereby returning the sensor bulb 38B and the valve 38A to their standard levels of responsiveness.

In addition to, or in place of, the aperture 42, the system 10 can include any suitable feature, and the sensor bulb 38B can be arranged in any suitable manner, to expose the sensor bulb 38B to relatively warmer ambient air to warm the sensor bulb 38B if it becomes overcooled. For example, the sensor bulb 38B can be positioned at an opening or aperture in the vehicle sufficient to direct ambient air from outside of the vehicle to the sensor bulb 38B. Such an aperture can be at any suitable location in the vehicle, such as proximate to a drainage opening for the rear evaporator 32.

Operation of the air conditioning system 10 will now be described. The refrigerant enters the compressor 12 in a low pressure, low temperature, gaseous form. The compressor 12 compresses the refrigerant into a high pressure and high temperature gaseous state, and then the gas is pumped to and through the condenser 14. As the hot, compressed refrigerant is pumped through the condenser 14, the refrigerant cools and condenses. The refrigerant exits the condenser 14 as a high pressure liquid, which is pumped to the valve 28A of the front TEV assembly 28.

If the valve 28A is open, the cool, high pressure liquid refrigerant is pumped through the front evaporator 22. As the refrigerant passes through the front evaporator 22, it changes from a liquid to a gas and evaporates, thereby extracting heat from, and cooling, the air around the evaporator. The cool air is blown into the passenger cabin by the front blower 24. The heat in the air causes molecules of the refrigerant to separate, which changes the liquid to a gas. The refrigerant exits the evaporator as a cool, low pressure gas, and then returns to the compressor 12 for another cooling cycle.

Upon exiting the front evaporator 22, the temperature of the refrigerant corresponds to the temperature of the air blown into the front of the passenger cabin. Thus, if the temperature of the refrigerant as it exits the front evaporator 22 is higher than a predetermined temperature, as detected by an increase in pressure of the gas in the sensor bulb 28B, then the valve 28A will remain open so that additional refrigerant will be circulated through the front evaporator 22. If the sensor bulb 28B detects that the temperature of the refrigerant is at or below a predetermined temperature due to a decrease in pressure of the gas in the sensor bulb 28B, then the valve 28A will close to prevent additional refrigerant from passing through the front evaporator 22.

The rear evaporator assembly 18 functions in substantially the same way that the front evaporator assembly 16 does. Because the sensor bulb 38B is arranged outside of the rear airflow chamber 36 and exposed to ambient air of the passenger cabin and/or air outside of the vehicle, the sensor bulb 38B can be warmed by the relatively warmer ambient air to restore its responsiveness in instances where the sensor bulb 38B has become overcooled, such as if the valve 38A remains open when the rear evaporation assembly 18 is not in use.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air conditioning system for a rear passenger cabin of a vehicle, the system comprising:
   a blower for the rear passenger cabin;
   an evaporator for the rear passenger cabin;
   an airflow chamber for the rear passenger cabin extending between the blower and the evaporator to direct airflow generated by the blower to the evaporator, the airflow chamber defines an aperture through which the airflow exits the chamber; and a thermal expansion valve assembly including:
  a valve on an input side of the evaporator; and
  a sensor bulb arranged on an output side of the evaporator external to the airflow chamber, aligned with airflow exiting the chamber through the aperture, and exposed to ambient air of the rear passenger cabin;
a metering gas disposed within both the valve and the sensor bulb, the metering gas in the valve in fluid communication with the metering gas in the sensor bulb, the metering gas moving the valve between a closed position and an open position based upon a temperature of refrigerant flowing out of the evaporator sensed by the sensor bulb;
wherein the sensor bulb is exposed to ambient air of the rear passenger cabin and is in the path of airflow generated by the blower to quickly warm the sensor bulb when overcooled to restore the sensor bulb to a predetermined standard level of responsiveness.

2. The air conditioning system of claim 1, wherein the sensor bulb is directly aligned with the aperture.

3. The air conditioning system of claim 1, wherein the airflow path of ambient air includes air from outside the vehicle.

4. An air conditioning system for a rear passenger cabin of a vehicle, the system comprising:
  a rear blower for the rear passenger cabin;
  a rear evaporator for the rear passenger cabin;
  a rear airflow chamber for the rear passenger cabin extending between the rear blower and the rear evaporator to direct airflow generated by the rear blower to the rear evaporator, a wall of the rear airflow chamber defining an aperture through which the airflow exits the rear airflow chamber; and
  a rear thermal expansion valve (TEV) assembly configured to regulate flow of refrigerant to the rear evaporator, the rear TEV assembly including a sensor bulb outside of the chamber aligned with the aperture such that airflow generated by the rear blower reaches the sensor bulb;
  a valve on an input side of the evaporator;
  wherein a metering gas is disposed within both the valve and the sensor bulb, the metering gas in the valve is in fluid communication with the metering gas in the sensor bulb, the metering gas moving the valve between a closed position and an open position based upon a temperature of refrigerant flowing out of the rear evaporator sensed by the sensor bulb; and
  wherein the sensor bulb is exposed to ambient air of the rear passenger cabin and is in the path of airflow generated by the rear blower to quickly warm the sensor bulb when overcooled to restore the sensor bulb to a predetermined standard level of responsiveness.

5. The air conditioning system of claim 4, further comprising a condenser, a compressor, a front evaporator, a front blower, a front airflow chamber extending between the front blower and the front evaporator, and a front thermal expansion valve (TEV) assembly.

6. An air conditioning system for a passenger cabin of a vehicle, the system comprising:
  a condenser;
  a compressor;
  a front evaporator assembly for a front portion of the passenger cabin; and
  a rear evaporator assembly for a rear portion of the passenger cabin, the rear evaporator assembly including: a rear blower, a rear evaporator, a rear airflow chamber extending between the rear blower and the rear evaporator, an aperture defined by a wall of the rear airflow chamber, a valve on an input side of the rear evaporator, a sensor bulb on an output side of the rear evaporator and aligned with the aperture outside of the rear airflow chamber to be exposed to airflow flowing out from within the rear airflow chamber and exposed to ambient air of the rear passenger cabin to warm the sensor bulb when the sensor bulb is overcooled to restore the sensor bulb to a predetermined standard level of responsiveness; and
  metering gas disposed within both the valve and the sensor bulb, the metering gas in the valve in fluid communication with the metering gas in the sensor bulb, the metering gas moving the valve between a closed position and an open position based upon a temperature of refrigerant flowing out of the rear evaporator sensed by the sensor bulb.

7. The air conditioning system of claim 6, wherein the front evaporator assembly includes a front blower, a front evaporator, a front airflow chamber extending from the front blower to the front evaporator, and a front thermal expansion valve assembly.

8. The air conditioning system of claim 6, further comprising a refrigerant conduit connected to the condenser, the compressor, the front evaporator assembly, and the rear evaporator assembly.

9. The air conditioning system of claim 6, wherein the ambient airflow originates external to the air conditioning system.

10. The air conditioning system of claim 6, further comprising a motor vehicle including the air conditioning system.

* * * * *